(12) United States Patent
Toyonaga et al.

(10) Patent No.: US 7,463,003 B2
(45) Date of Patent: Dec. 9, 2008

(54) MOTOR CONTROL SYSTEM FOR CONTROLLING A PLURALITY OF MOTORS

(75) Inventors: Tatsuo Toyonaga, San Jose, CA (US); Yuji Kaneko, Yokohama (JP)

(73) Assignees: Sodick Co., Ltd., Kanagawa (JP); Sodick America Corporation, San Jose, CA (US)

( * ) Notice: Subject to any disclaimer, the term of this patent is extended or adjusted under 35 U.S.C. 154(b) by 47 days.

(21) Appl. No.: 11/501,846

(22) Filed: Aug. 10, 2006

(65) Prior Publication Data
US 2008/0036414 A1 Feb. 14, 2008

(51) Int. Cl.
*G05B 11/32* (2006.01)

(52) U.S. Cl. .................. 318/625; 318/434; 318/433; 318/432

(58) Field of Classification Search .............. 318/625, 318/34, 434, 599, 47, 85, 700, 811, 433, 318/432
See application file for complete search history.

(56) References Cited

U.S. PATENT DOCUMENTS

| | | | |
|---|---|---|---|
| 5,252,902 A | 10/1993 | Uehara et al. | |
| 5,748,465 A | 5/1998 | Kaneko | |
| 7,026,778 B2 | 4/2006 | Aoyama et al. | |
| 2004/0160206 A1 | 8/2004 | Komaki et al. | |
| 2004/0251863 A1* | 12/2004 | Hahn et al. | 318/434 |

FOREIGN PATENT DOCUMENTS

| | | |
|---|---|---|
| JP | 8-205574 | 8/1996 |
| JP | 2003-169497 | 6/2003 |

* cited by examiner

*Primary Examiner*—Karen Masih
(74) *Attorney, Agent, or Firm*—McDermott Will & Emery LLP

(57) ABSTRACT

A motor control system for controlling a plurality of motors for moving an object in respectively different axial directions that includes a plurality of target devices, each target device including a (pulse width modulation) PWM signal generator that generates a PWM signal for driving a motor using a triangular signal, and a host device for supplying a synchronization signal to each of the target devices, wherein each target device is arranged with a corresponding motor, and each PWM signal generator resets the triangular signal in response to the synchronization signal.

3 Claims, 2 Drawing Sheets

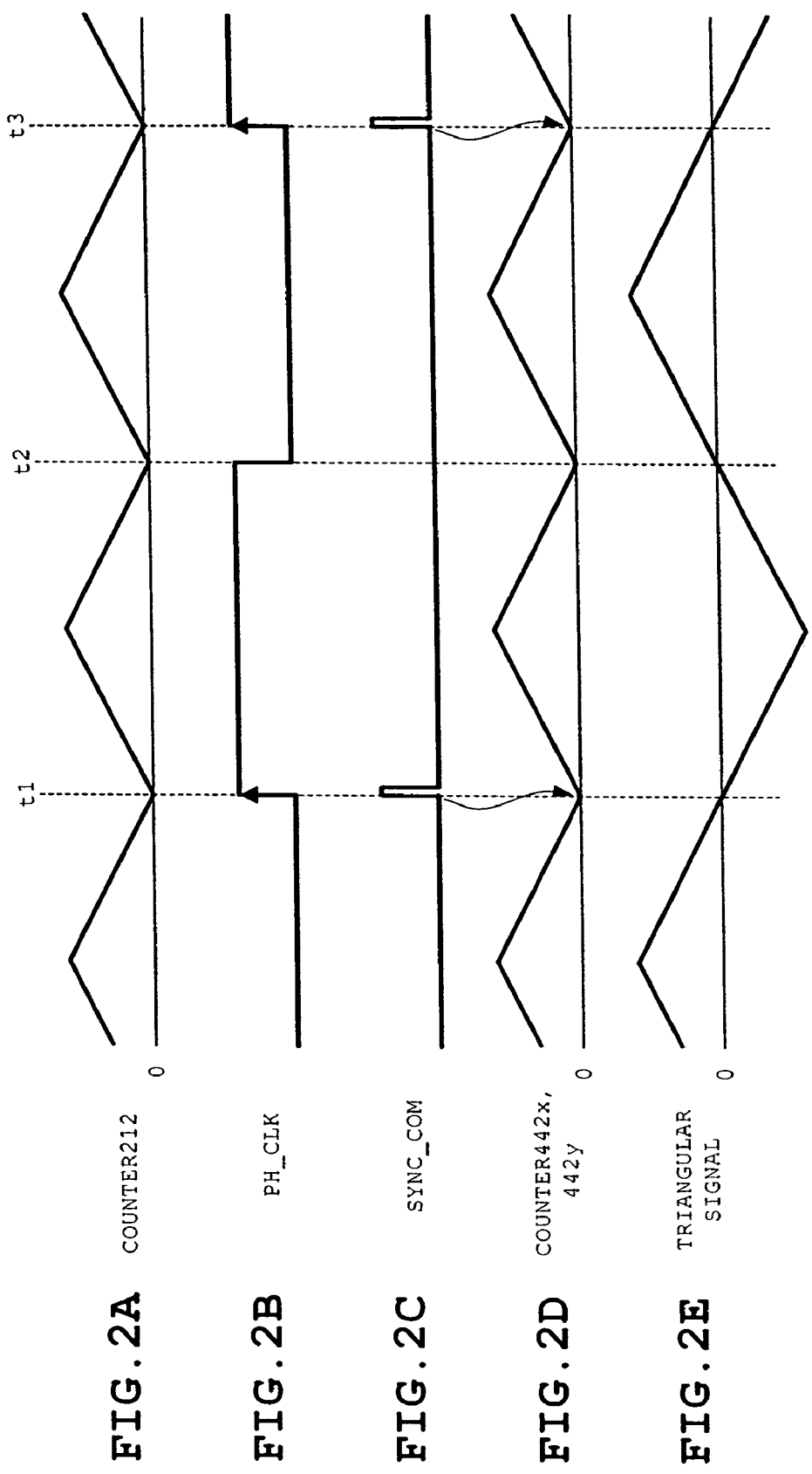

MOTOR CONTROL SYSTEM FOR CONTROLLING A PLURALITY OF MOTORS

FIELD OF THE INVENTION

The present invention relates to a motor control system for controlling a plurality of motors. In particular, the present invention relates to a motor control system for controlling motors to cause an object to move in the directions of different axes.

DESCRIPTION OF THE PRIOR ART

Machine tools such as electric discharge machines and machining centers are comprised of motors for moving an object in respective axial directions, an analysis section for analyzing NC code to obtain a path along which the object will move, and a position/velocity/current control section for controlling position, velocity and drive current for motors based on the path. The object is, for example, a tool attached to a head, or a workpiece fixed to a table. Machine tools are generally provided with a numerical control unit (NC) that is physically separate. The analysis section is contained in the numerical control unit, and NC code is sent to the analysis section as an NC program or in a format input by the operator. Many conventional machine tools are implemented with either of the following typical hardware structures:

(1) A structure where one analysis section is provided as a host device and the position/velocity/current control sections and servo amps are arranged as target devices for respective motors; and (2) A structure where the analysis section and the position/velocity/current control section are the same host device and current commands are sent from the host device to the servo amps for the respective motors.

In the case of the first structure (1), signals can be transmitted from the analysis section to each of the position/velocity/current control sections using comparatively low speed wiring such as a serial bus, which means that it is possible to eliminate a lot of wiring.

In the case of the second structure (2), since current commands to the servo amps for each motor are determined using the output of the single host device, it is easy to synchronize a plurality of motors and it is possible to realize high speed high precision drive. U.S. Patent Publication No. 2004-160206 and U.S. Pat. No. 7,026,778 disclose a device relating to motor control using the second structure (2).

However, in the case of the first structure (1), it is difficult to synchronize target devices as position/velocity/current control sections that are arranged for respective motors. Specifically, as the synchronous drive of motors is also difficult, the first structure (1) is unsuitable for machine tools that require high-speed high precision performance. Also, in the case of the second structure (2), since the current control having the heaviest computational load is processed using a processor of the single host device, the processing load on the processor is increased if a machine tool needs many control axes. Therefore, when controlling a number of motors it becomes necessary to handle the setting of the motor execution cycle to a low frequency etc., and high-speed drive is complicated.

SUMMARY OF THE INVENTION

The present invention attends to the above-mentioned problems. In general, the invention provides a motor control system with reduced wiring for control signals for driving a plurality of motors at a high speed and with high precision.

According to one aspect of the present invention, a motor control system for controlling a plurality of motors for moving an object in respectively different axial directions includes a plurality of target devices, each target device including a Pulse Width Modulation (PWM) signal generator that generates a PWM signal for driving a motor using a triangular signal, and a host device for supplying a synchronization signal to each of the target devices, wherein the target device is arranged for each motor, and the PWM signal generator resets the triangular signal in response to the synchronization signal.

Preferably, each PWM signal generator has a counter for repeatedly counting clock intervals in order to generate the triangular signal, and the host device has a counter for repeatedly counting clock intervals at a cycle that is the same as or an integer number of times that of the counter in the PWM signal generator and generates a synchronization signal when the count of the counter in the PWM signal generator reaches a specified value.

It is preferable for a clock input to the counter in the host device to have the same frequency as a clock input to each of the counters in the PWM signal generators, but the clock input to the host device counter can also have a frequency of an integer number of times the frequency of the clock input to the counter in each triangular wave generator.

Also, preferably, each target device further includes a reset signal generator that generates a reset signal in response to the synchronization signal, and the triangular signal generator resets a triangular signal in response to the reset signal.

According to another aspect of the present invention a motor control system for controlling a first motor and a second motor for moving an object in respectively different axial directions includes a position and velocity controller that generates first and second velocity commands based on first and second position errors between first and second position commands and first and second position feedbacks, and that generates first and second torque commands based on first and second velocity errors between first and second velocity commands and first and second velocity feedbacks, respectively. The motor control system further includes a first servo amp that supplies a first drive current to the first motor and generates a first current feedback, a first PWM signal generator that supplies a first PWM signal to the first servo amp, a first current controller that supplies a first three phase voltage command to the first PWM signal generator based on the first current feedback and the first torque command, a second servo amp that supplies a second drive current to the second motor and generates a second current feedback, a second PWM signal generator that supplies a second PWM signal to the second servo amp, a second current controller that supplies a second three phase voltage command to the second PWM signal generator based on the second current feedback and the second torque command, and first and second serial buses that transmit the first and second torque commands to the first and second controllers, respectively.

Preferably, the first PWM signal generator has a first counter that generates a first count signal in order to generate a triangular signal, the second PWM signal generator has a second counter that generates a second count signal in order to generate a triangular signal, and the position and velocity controller includes a synchronization signal generator that generates a synchronization signal that synchronizes the first and second counters.

According to still another aspect of the present invention a motor control system for controlling a first motor and a second motor for moving an object in respectively different axial directions includes a first PWM signal generator having a first counter that repeatedly counts clock intervals and generating a first PWM signal for the first motor, a second PWM signal generator having a second counter that repeatedly counts clock intervals and generating a second PWM signal for the second motor, and a synchronization signal generator that generates a synchronization signal that synchronizes the first and second counters.

As each triangular signal generator repeatedly resets the triangular signal in response to a synchronization signal generated by the host device, it is possible to suppress undesirable variation in phase of triangular signals. Accordingly, it is possible to achieve phase synchronization of a plurality of motors, and it is possible to realize a motor control system having high speed and high performance.

Also, by having a structure in which the positional control and the velocity control, which have a light processing load, are carried out in the host device, and in which the current control processing, that has a heavy processing load, is carried out in each target device, it is possible to connect the host device and each target device using comparatively low-speed wiring such as a serial bus, thereby resulting in reduced wiring in the motor control system.

Other novel features of the invention will be described in the following description.

BRIEF DESCRIPTION OF THE DRAWINGS

FIG. 2A is a timing chart showing a count signal within the host device.

FIG. 2B is a timing chart showing a synchronization signal within the host device.

FIG. 2C is a timing chart showing reset signals within the target devices.

FIG. 2D is a timing chart showing a count signal within the target devices.

FIG. 2E is a timing chart showing a triangular signal within the target devices.

DETAILED DESCRIPTION OF THE INVENTION

Figure 1:
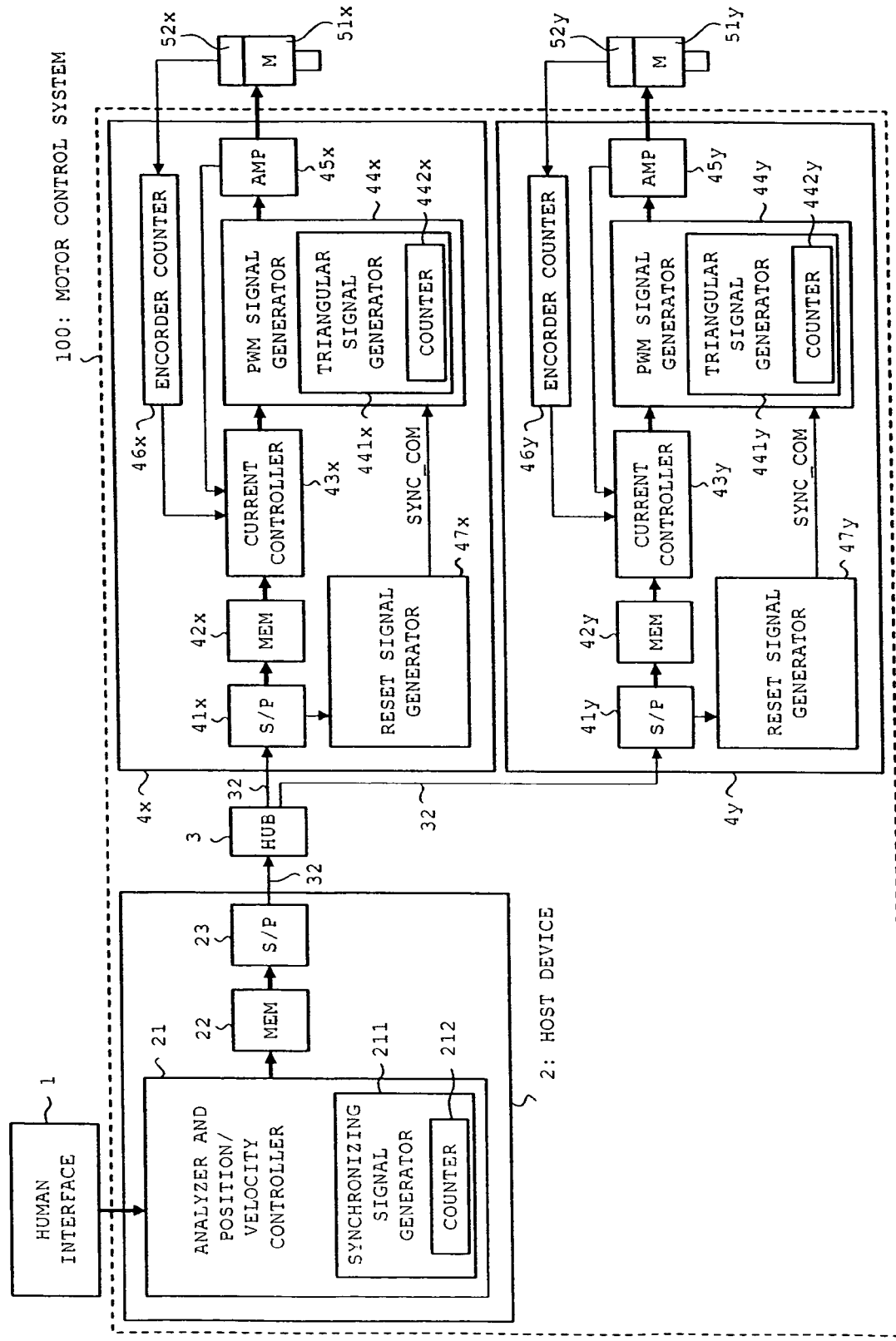
FIG. 1 is a block diagram showing a motor control system of the present invention.

An exemplary embodiment of a motor control system of the present invention will now be described with reference to the drawings.

As shown in FIG. 1, a motor control system 100 comprises a host device 2, a hub 3, and an X-axis controller 4x and a Y-axis controller 4y as target devices. In order to simplify the description, with this embodiment the motor control system 100 controls two servo motors 51x and 51y for moving an object in two directions of the X-axis and the Y-axis. However, the control axes are not thus limited. When an additional control axis becomes necessary, it is possible to add a motor and a target device similar to the X-axis controller 4x.

A human interface 1 is a unit provided with a computer, for example a personal computer provided with a keyboard, mouse, display etc. In this exemplary embodiment, the human interface 1 and the host device 2 are contained in a numerical control device ("NC") that is physically separated from the machine tool. An operator of the machine tool can input various types of data and commands etc via the human interface 1, which are then supplied to the host device 2.

The host device 2 is comprised of an analyzer and position/velocity controller 21, memory 22 and a serial to parallel converter 23. The analyzer and position/velocity controller 21 is constituted by a single CPU etc. The analyzer and position/velocity controller 21 is provided internally with a data/program storage section (memory) (not shown), and prior to machining an NC program is stored in the storage section. The analyzer and position/velocity controller 21 obtains path information for moving the object that is to be operated on by the machine tool by analyzing the NC code defined in the NC program. Further, the analyzer and position/velocity controller 21 generates position commands for the motors 51x, 51y, respectively, based on the path information. Position feedbacks for the x-axis and the y-axis are supplied to the position/velocity controller 21 from position detectors appropriately provided in the servo motors 51x and 51y. Velocity commands for servo motors 51x and 51y are generated based on position errors between position commands and position feedbacks. Further, torque commands for servo motors 51x and 51y are generated based on errors between velocity commands and velocity feedbacks which can be differential values of the position feedbacks.

Torque commands are temporarily stored in the memory 22, then converted from parallel signals to serial signals by the serial to parallel converter 23 and supplied to the X-axis controller 4x and the Y-axis controller 4y. In this way, the position/velocity control processing, which has a light processing load, are executed by a single processing unit, namely the analyzer and position/velocity controller 21. The current control processing, which has a high processing load, is respectively executed by the X-axis controller 4x and the Y-axis controller 4y. In doing this, it is possible to wire between the host device 2 and the X-axis controller 4x and the Y-axis controller 4y using comparatively low velocity serial buses 32, respectively. It is therefore possible to reduce the number of wires in the motor control system. The hub 3 is a distributor for transmitting torque commands generated by the host device 2 to the X-axis controller 4x and the Y-axis controller 4y.

The X-axis controller 4x comprises a serial to parallel converter 41x, a memory 42x, a current controller 43x, a PWM signal generator 44x, a servo amp 45x, an encoder counter 46x, and a reset signal generator 47x. The serial to parallel converter 41x converts torque commands transmitted from the host device 2 via the hub 3 and serial bus 32 from a serial signal to a parallel signal. The converted torque command is temporarily stored in the memory 42x. The current controller 43x is constituted by a single CPU. Position feedback for the servo motor 51x is generated by the encoder counter 46x and current feedback is generated by the servo amp 45x, and both feedbacks are supplied to the current controller 43x. The current controller 43x reads out a torque command stored in the memory 42x, and generates a three phase voltage command based on the position feedback, the current feedback and the torque command. The PWM signal generator 44x has a triangular signal generator 441x that generates a triangular signal of a specified period, and the PWM signal generator generates a PWM signal based on the triangular signal and the three phase voltage command. The servo amp 45x generates a drive current based on the PWM signal, and supplies the drive current to the servo motor 51x. The servo motor 51x is equipped with a rotary encoder 52x. The rotary encoder 52x supplies angular position of the servo motor 51x to the encoder counter 46x as a pulse signal. The triangular signal generator 441x has a clock generator (not shown) and a counter 442x which counts the clock intervals to generate a count signal, as shown in FIG. 2D. The triangular signal generator 441x generates a triangular signal, as shown in FIG. 2E, using the count signal from counter 442x. The counter 442x can be an up down counter, or can be a counter for simply repeatedly counting from zero to an upper limit value.

The Y-axis controller 4y is realized using similar elements as the X-axis controller 4x, as described above, and so its description is therefore not repeated here.

The invention achieves matching of the periods of triangular signals generated by the triangular signal generators 441x and 441y and driving of the servo motors 51x, 51y in synchronism. For this reason, clock generators inside the triangular signal generators 441x and 441y generate clock intervals at the same frequency or at frequencies an integer number of times different. However, in actual fact the clock generators are separate, which means that the respective clocks will become asynchronous with the passage of time. As a result, variation occurs in the count signals of the counters 442x and 442y, resulting in phase shifting in the triangular signals generated by the triangular signal generators 441x and 441y. If this type of situation arises, each motor is in an asynchronous state and it is not possible to perform high precision control of the motors.

Therefore, a synchronization signal generator 211 for generating a synchronization signal for resetting each triangular signal generator at the same time is provided within the position/velocity controller 21. The synchronization signal generator 211 has a counter 212 for repeatedly counting clocks at a period that is the same as or an integer number of times that of the counters 442x and 442y. FIG. 2A shows a count signal generated by the counter 212. The counter 212 counts clock intervals output from a clock generator (not shown) provided either internally or externally. The counter 212 can be an up down counter, or can be an up counter for simply repeatedly counting from zero to an upper limit value. The synchronization signal generator 211 generates a signal PH_CLK, namely a synchronization signal, every time the count of the counter 212 reaches a specified value. The signal PH_CLK is a rectangular signal switching between "Hi" and "Low" when the count signal in FIG. 2A becomes "0". For example, the signal PH_CLK switches from "Low" to "Hi" at time t1, and switched from "Hi" to "Low" at time t2. The signal PH_CLK is supplied via the hub 3, serial bus 32 and the serial to parallel converter 41x to the reset signal generators 47x and 47y. The PWM signal generators 44x, 44y reset the respective count signals to zero in accordance with this synchronization signal PH_CLK, and the count starts again. In this manner, phase shifting of the triangular signals generated in the triangular signal generators 441x and 441y is periodically corrected, and synchronization of each triangular signal is achieved.

In order to simplify the description, the following description is given mainly using elements contained in the X-axis controller 4x, but the same signal processing is also carried out in the Y-axis controller 4y.

The reset signal generator 47x generates a pulse signal SYNC_COM as a reset signal, in response to the rising edge of the signal PH_CLK, as shown in FIG. 2C. The signal SYNC_COM is generated at, for example, time t1 and time t3, namely every one cycle of signal PH_CLK. The signal SYNC_COM is supplied to the triangular signal generator 441x. The triangular signal generator 441x resets the count signal to zero in response to the rising edge of the signal SYNC_COM, and again starts generating the count signal. In this way, the triangular signal generator 441x resets the triangular signal in response to the reset signal. For example, reset of the count signal is carried out at time t1 and time t3. From time t1 to time t3, even if phase shifting occurs between triangular signals generated in the triangular signal generators 441x and 441y reset of the count signal in response to the rising edge of the signal SYNC_COM is repeatedly carried out, which means that it is possible to suppress phase shifting between each triangular signal. Accordingly, synchronization of the servo motors 51x and 51y is achieved, and a motor control system having high speed and high performance is realized.

The present invention is not intended to be limited to the disclosed form. It is clear that many improvements and variations are possible with reference to the above description. For example, as illustrated in FIGS. 2C and 2D, count signals of counters 442x and 442y are reset to zero in response to a rising edge of the signal SYNC_COM. Alternatively, they may be reset to zero in response to a rising edge of the signal PH_CLK. The illustrated embodiment was selected to explain the essence and practical application of the invention.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A motor control system for controlling a first motor and a second motor for moving an object in respectively different axial directions comprising:
   a position and velocity controller that generates first and second velocity commands based on first and second position errors between first and second position commands and first and second position feedbacks, and that generates first and second torque commands based on first and second velocity errors between first and second velocity commands and first and second velocity feedbacks, respectively;
   a first servo amp that supplies a first drive current to the first motor and generates a first current feedback;
   a first PWM signal generator that supplies a first PWM signal to the first servo amp;
   a first current controller that supplies a first three phase voltage command to the first PWM signal generator based on the first current feedback and the first torque command;
   a second servo amp that supplies a second drive current to the second motor and generates a second current feedback;
   a second PWM signal generator that supplies a second PWM signal to the second servo amp;
   a second current controller that supplies a second three phase voltage command to the second PWM signal generator based on the second current feedback and the second torque command; and
   first and second serial buses that transmit the first and second torque commands to the first and second current controllers, respectively.

2. The motor control system of claim 1, wherein the first PVM signal generator includes a first counter that generates a first count signal in order to generate a triangular signal, the second PWM signal generator has a second counter that generates a second count signal in order to generate a triangular signal, and the position and velocity controller includes a synchronization signal generator that generates a synchronization signal that synchronizes the first and second counters.

3. The motor control system of claim 1, wherein the synchronization signal generator includes a third counter for repeatedly counting clock intervals at a period that is the same as or an integer number of times that of the first and second counters.

* * * * *